(12) United States Patent
Wen et al.

(10) Patent No.: US 10,243,684 B2
(45) Date of Patent: Mar. 26, 2019

(54) WAVELENGTH-DIVISION MULTIPLEXED POLARIZATION-INSENSITIVE TRANSMISSIVE MODULATOR

(71) Applicant: Futurewei Technologies, Inc., Plano, TX (US)

(72) Inventors: Yangjing Wen, Cupertino, CA (US); Yu Sheng Bai, Los Altos Hills, CA (US); Hongzhen Wei, Pleasanton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 1 day.

(21) Appl. No.: 15/602,909

(22) Filed: May 23, 2017

(65) Prior Publication Data

US 2018/0343076 A1 Nov. 29, 2018

(51) Int. Cl.
*H04B 10/516* (2013.01)
*H04J 14/06* (2006.01)
(Continued)

(52) U.S. Cl.
CPC ............ *H04J 14/02* (2013.01); *G02B 6/2938* (2013.01); *H04B 10/516* (2013.01); *H04J 14/06* (2013.01)

(58) Field of Classification Search
CPC ... H04Q 2213/367; H04Q 2213/13295; H04Q 2213/017; H04Q 2213/295;
(Continued)

(56) References Cited

U.S. PATENT DOCUMENTS 5,069,520 A 12/1991 Calvani et al.
5,495,366 A 2/1996 Esman et al.
(Continued)

FOREIGN PATENT DOCUMENTS

CN 1369153 A 9/2002
CN 1900768 A 1/2007
(Continued)

OTHER PUBLICATIONS

Wen, et al., "Polarization Insensitive Integrated Optical Modulator," U.S. Appl. No. 15/417,569, filed Jan. 27, 2017, 25 pages.
(Continued)

*Primary Examiner* — David C Payne
*Assistant Examiner* — Omar S Ismail
(74) *Attorney, Agent, or Firm* — Conley Rose, P.C.

(57) ABSTRACT

A wavelength-division multiplexed (WDM) polarization-independent transmissive modulator (PITM) that receives a multi-wavelength continuous wave (CW) light of indeterminate polarization, splits the multi-wavelength CW light into two transverse electric (TE) polarized components, demultiplexer the polarized components into single-wavelength CW lights, modulates the single-wavelength CW lights using four-port cross-state or bypass-state modulators, multiplexes the modulated output of the four-port modulators (FPM) into two polarized modulated components, and combines the two polarized modulated components into a multi-wavelength modulated output signal.

23 Claims, 7 Drawing Sheets

(51) Int. Cl.
*H04J 14/02* (2006.01)
*G02B 6/293* (2006.01)

(58) Field of Classification Search
CPC ....... H04Q 2011/0016; H04Q 2011/295; H04J 14/06; H04J 14/0265; H04J 14/0264; H04B 10/504; H04B 10/505; H04B 10/5051; H04B 10/5053; H04B 10/532; H04B 10/5161; H04B 10/548; H04B 10/556; H04B 10/508; H04B 10/524; H04B 10/50575; H04B 10/614; H04B 10/6166; H04B 10/6163; H04B 10/516; H04B 10/2557; H04B 10/2563; G02B 6/2938
See application file for complete search history.

(56) References Cited

U.S. PATENT DOCUMENTS

| | | |
|---|---|---|
| 5,654,818 A | 8/1997 | Yao |
| 6,400,856 B1 | 6/2002 | Chin |
| 6,417,957 B1 | 7/2002 | Yao |
| 6,519,060 B1 | 2/2003 | Liu |
| 6,580,851 B1 | 6/2003 | Vahala et al. |
| 6,656,584 B1 | 12/2003 | Sugimoto et al. |
| 6,751,002 B2 | 6/2004 | Ovadia et al. |
| 7,065,272 B2 | 6/2006 | Taillaert et al. |
| 7,251,076 B1 | 7/2007 | Okada et al. |
| 7,327,911 B2 | 2/2008 | Piede et al. |
| 7,428,358 B2 | 9/2008 | Lu et al. |
| 8,131,156 B2 | 3/2012 | Yu |
| 8,923,660 B2 | 12/2014 | Dorin et al. |
| 8,988,753 B2 | 3/2015 | Schwedt et al. |
| 9,203,517 B2 | 12/2015 | Zhou et al. |
| 9,235,100 B1 | 1/2016 | Kaplan |
| 9,647,426 B1 | 5/2017 | Fish et al. |
| 9,831,944 B2 | 11/2017 | Izumi |
| 9,979,472 B1* | 5/2018 | Wang .................. H04B 10/541 |
| 2001/0004290 A1 | 6/2001 | Lee et al. |
| 2002/0041562 A1 | 4/2002 | Redmond et al. |
| 2002/0051600 A1 | 5/2002 | Hung |
| 2003/0118280 A1 | 6/2003 | Miyazaki et al. |
| 2003/0235370 A1 | 12/2003 | Taillaert et al. |
| 2004/0005056 A1 | 1/2004 | Nishioka et al. |
| 2004/0190107 A1 | 9/2004 | Hiironen et al. |
| 2004/0247227 A1 | 12/2004 | Eder et al. |
| 2005/0047727 A1 | 3/2005 | Shin et al. |
| 2005/0088724 A1 | 4/2005 | Lee et al. |
| 2005/0163503 A1 | 7/2005 | Lee et al. |
| 2006/0093360 A1 | 5/2006 | Kim et al. |
| 2006/0266744 A1 | 11/2006 | Nomaru |
| 2007/0121189 A1 | 5/2007 | Zami et al. |
| 2007/0230882 A1 | 10/2007 | Hainberger |
| 2008/0019693 A1 | 1/2008 | Sorin |
| 2009/0060525 A1 | 3/2009 | Von Lerber |
| 2009/0220230 A1 | 9/2009 | Kim et al. |
| 2010/0002881 A1 | 1/2010 | Youn et al. |
| 2010/0006784 A1 | 1/2010 | Mack et al. |
| 2010/0119229 A1 | 5/2010 | Roelkens et al. |
| 2010/0254719 A1 | 10/2010 | Zhang et al. |
| 2010/0303469 A1* | 12/2010 | Barton ............... H04B 10/505 398/184 |
| 2011/0122470 A1 | 5/2011 | Berrettini et al. |
| 2011/0142395 A1 | 6/2011 | Fortusini et al. |
| 2011/0273657 A1 | 11/2011 | Collings et al. |
| 2012/0014697 A1 | 1/2012 | Zhao et al. |
| 2012/0106963 A1 | 5/2012 | Huang et al. |
| 2012/0301068 A1 | 11/2012 | Meade et al. |
| 2013/0058652 A1 | 3/2013 | Charbonnier et al. |
| 2013/0129361 A1 | 5/2013 | Hsiao |
| 2014/0099057 A1 | 4/2014 | Sun et al. |
| 2014/0153862 A1 | 6/2014 | Picard et al. |
| 2014/0193152 A1 | 7/2014 | Zhou et al. |
| 2014/0341579 A1 | 11/2014 | Effenberger et al. |
| 2014/0348450 A1 | 11/2014 | Kachoosangi |
| 2014/0348460 A1 | 11/2014 | Dorin et al. |
| 2015/0063741 A1 | 3/2015 | Menezo et al. |
| 2015/0063807 A1 | 3/2015 | Simonneau et al. |
| 2015/0277207 A1 | 10/2015 | Fujikata |
| 2015/0316722 A1 | 11/2015 | Miao et al. |
| 2015/0338577 A1 | 11/2015 | Shi et al. |
| 2016/0007105 A1* | 1/2016 | Jeong ................. H04Q 11/0005 398/34 |
| 2016/0246005 A1 | 8/2016 | Liu et al. |
| 2016/0261352 A1 | 9/2016 | Wen et al. |
| 2016/0315699 A1 | 10/2016 | Izumi |
| 2016/0337041 A1 | 11/2016 | Wen et al. |
| 2017/0059887 A1 | 3/2017 | Park et al. |
| 2017/0155451 A1 | 6/2017 | Hayakawa |
| 2017/0346592 A1* | 11/2017 | Liu .......................... G02B 6/28 |
| 2018/0143460 A1* | 5/2018 | Wen ..................... G02B 6/2746 |

FOREIGN PATENT DOCUMENTS

| | | |
|---|---|---|
| CN | 100410733 C | 8/2008 |
| CN | 102143407 A | 8/2011 |
| CN | 102282509 A | 12/2011 |
| CN | 102820945 A | 12/2012 |
| CN | 103412367 A | 11/2013 |
| CN | 103424894 A | 12/2013 |
| CN | 104049375 A | 9/2014 |
| CN | 104122674 A | 10/2014 |
| CN | 104238023 A | 12/2014 |
| CN | 104297947 A | 1/2015 |
| CN | 102820945 B | 9/2015 |
| CN | 105223647 A | 1/2016 |
| CN | 104049375 B | 2/2016 |
| JP | H11167090 A | 6/1999 |
| JP | 2012203334 A | 10/2012 |
| JP | 2013530613 A | 7/2013 |
| TW | 476012 B | 2/2002 |
| WO | 0076103 A1 | 12/2000 |
| WO | 2014209294 A1 | 12/2014 |

OTHER PUBLICATIONS

Wen, et al., "Polarization Insensitive Micro Ring Modulator," U.S. Appl. No. 15/601,706, filed May 22, 2017, 39 pages.
Partial English Translation and Abstract of Chinese Patent Application No. CN102820945, Sep. 21, 2016, 4 pages.
Partial English Translation and Abstract of Chinese Patent Application No. CN104049375, Sep. 21, 2016, 6 pages.
Partial English Translation and Abstract of Chinese Patent Application No. CN104122674, Sep. 21, 2016, 6 pages.
Dai, D., et al., "Novel Concept for Ultracompact Polarization Splitter-Rotator based on Silicon Nanowires," Optics Express, vol. 19, No. 11, May 23, 2011, pp. 10940-10949.
Rajesh, K., "Data Center Network—Top of Rack (TOR) vs End of Row (EOR) Design," Feb. 9, 2012, 4 Pages.
Smith, D., et al., "Colourless 10Gb/s Reflective SOA-EAM with Low Polarization Sensitivity for Long-reach DWDM-PON Networks," ECOC 2009, VDE Verlag GMBH, Sep. 2009, 2 pages.
Menezo, S., et al., "Reflective Silicon Mach Zehnder Modulator With Faraday Rotator Mirror effect for self-coherent transmission," OFC/NFOEC Technical Digest Optical Society of America, 2013, 3 pgs.
Foreign Communication From a Counterpart Application, PCT Application No. PCT/CN2016/080513, English Translation of International Search Report dated Aug. 1, 2016, 8 pages.
Foreign Communication From a Counterpart Application, PCT Application No. PCT/CN2016/080513, English Translation of Written Opinion dated Aug. 1, 2016, 4 pages.
Office Action dated Aug. 14, 2017, 13 pages, U.S. Appl. No. 15/601,706, filed May 22, 2017.
Office Action dated Sep. 8, 2017, 29 pages, U.S. Appl. No. 15/136,396, filed Apr. 22, 2016.
Machine Translation and Abstract of Japanese Publication No. JPH11167090, Jun. 22, 1999, 9 pages.

(56) References Cited

OTHER PUBLICATIONS

Foreign Communication From a Counterpart Application, PCT Application No. PCT/CN2018/073645, English Translation of International Search Report dated Apr. 23, 2018, 6 pages.
Foreign Communication From a Counterpart Application, PCT Application No. PCT/CN2018/073645, English Translation of Written Opinion dated Apr. 23, 2018, 5 pages.
Office Action dated Jun. 22, 2018, 29 pages, U.S. Appl. No. 15/417,569, filed Jan. 27, 2017.
Ng, T., et al., "Sagnac-loop phase shifter with polarization-independent operation," Review of Scientific Instruments 82, 013106, 2011, 4 pages.
Chen, S., et al., "Full-duplex bidirectional data transmission link using twisted lights multiplexing over 1.1-km orbital angular momentum fiber," Scientific Reports, Nov. 30, 2016, 7 pages.
Liu, J., "Demonstration of polarization-insensitive spatial light modulation using a single polarization-sensitive spatial light modulator," Scientific Reports, Jul. 6, 2015, 7 pages.
Shieh, W., et al., "Theoretical and experimental study on PMD-supported transmission using polarization diversity in coherent optical OFDM systems," Optics Express, vol. 15, No. 16, Aug. 6, 2007, 12 pages.
Yunhong, D., et al., "Polarization diversity DPSK demodulator on the silicon-on-insulator platform with simple fabrication," Optics Express, vol. 21, No. 6, 2013, 8 pages.
Zou, "An SOI Based Polarization Insensitive Filter for All-optical Clock Recovery," Optics Express, vol. 22, No. 6, Mar. 2014, pp. 6647-6652.
Luo, et al., Time- and Wavelength-Division Multiplexed Passive Optical Network (TWDM-PON) for Next-Generation PON Stage 2 (NG-PON2), in Journal of Lightwave Technology, vol. 31, No. 4, Feb. 15, 2013, pp. 587-593.
Watts, M., et al., "Low-Voltage, Compact, Depletion-Mode, Silicon Mach-Zehnder Modulator," IEEE Journal of Selected Topics in Quantum Electronics, vol. 16, No. 1, Jan./Feb. 2010, pp. 159-164.
Patel, D., et al., "A Lumped Michelson Interferometric Modulator in Silicon," CLEO, Optical Society of America, 2014, 2 pages.
Zhang, J., et al., "A tunable polarization diversity silicon photonics filter," Optics Express, vol. 19, No. 14, Jul. 4, 2011, 10 pages.
Fukuda, H., et al., "Silicon photonic circuit with polarization diversity," Optics Express, vol. 16, No. 7, Mar. 31, 2008, 9 pages.
Foreign Communication From a Counterpart Application, PCT Application No. PCT/CN2017/110881, English Translation of International Search Report dated Jan. 31, 2018, 7 pages.
Foreign Communication From a Counterpart Application, PCT Application No. PCT/CN2017/110881, English Translation of Written Opinion dated Jan. 31, 2018, 4 pages.
Office Action dated Apr. 23, 2018, 3 pages, U.S. Appl. No. 15/601,706, filed May 22, 2017.
Office Action dated Jan. 31, 2018, 25 pages, U.S. Appl. No. 15/601,706, filed May 22, 2017.
Office Action dated Feb. 6, 2018, 29 pages, U.S. Appl. No. 15/136,396, filed Apr. 22, 2016.
Office Action dated Feb. 13, 2017, 21 pages, U.S. Appl. No. 15/357,199, filed Nov. 21, 2016.
Office Action dated Aug. 11, 2017, 33 pages, U.S. Appl. No. 15/357,199, filed Nov. 21, 2016.
Office Action dated Dec. 15, 2017, 16 pages, U.S. Appl. No. 15/357,199, filed Nov. 21, 2016.
Machine Translation and Abstract of Chinese Publication No. CN102143407, Aug. 3, 2011, 24 pages.
Machine Translation and Abstract of Chinese Publication No. CN105223647, Jan. 6, 2016, 35 pages.
Machine Translation and Abstract of Chinese Publication No. CN103412367, Nov. 27, 2013, 13 pages.
Machine Translation and Abstract of Chinese Publication No. CN104238023, Dec. 24, 2014, 12 pages.
Dai, D., et al., "Passive technologies for future large-scale photonic integrated circuits on silicon: polarization handling, light non-reciprocity and loss reduction," Light: Science & Applications, 2012, 12 pages.
Foreign Communication From a Counterpart Application, PCT Application No. PCT/CN2018/087982, English Translation of International Search Report dated Aug. 14, 2018, 4 pages.
Foreign Communication From a Counterpart Application, PCT Application No. PCT/CN2018/087733, English Translation of International Search Report dated Sep. 5, 2018, 6 pages.
Foreign Communication From a Counterpart Application, PCT Application No. PCT/CN2018/087733, English Translation of Written Opinion dated Sep. 5, 2018, 4 pages.
Office Action dated Jun. 14, 2018, 18 pages, U.S. Appl. No. 15/357,199, filed Nov. 21, 2016.
Machine Translation and Abstract of Japanese Publication No. JP2012203334, Oct. 22, 2012, 11 pages.
Yao, S., "Polarization Insensitive Antenna Remoting Link with Frequency Conversion Gain," IEEE Photonics Technology Letters, vol. 12, No. 10, Oct. 2000, pp. 1382-1384.
Charbonnier, B., et al., "Silicon Photonics for Next Generation FDM/FDMA PON," J. Opt. Commun. Netw., vol. 4, No. 9, Sep. 2012, pp. A29-A37.
Esman, R.D., et al., "Polarization-Independent Fiber-Optic Microwave Modulator," Summer Tropical Meeting Digest on Optical Microvave Interactions, Jul. 19, 1993, pp. 31-32.
Foreign Communication From A Counterpart Application, Japanese Application No. 2017-559501, Japanese Office Action dated Oct. 2, 2018, 8 pages.
Foreign Communication From A Counterpart Application, Japanese Application No. 2017-559501, English Translation of Japanese Office Action dated Oct. 2, 2018, 10 pages.
Fukuda, H., et al. "Polarization Beam Splitter and Rotator for Polarization-Independent Silicon Photonic Circuit," 4th IEEE International Conference on Group IV Photonics, Oct. 15, 2007, pp. 4-6.
Foreign Communication From A Counterpart Application, European Application No. 17871334.3, Extended European Search Report dated Dec. 20, 2018, 6 pages.
Office Action dated Jan. 14, 2019, 28 pages, U.S. Appl. No. 15/357,199, filed Nov. 21, 2016.

\* cited by examiner

WAVELENGTH-DIVISION MULTIPLEXED POLARIZATION-INSENSITIVE TRANSMISSIVE MODULATOR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The efficacy of conventional optical modulators, such as Mach-Zehnder modulators (MZM), depend upon the polarization orientation of the incoming optical carrier wave, which may vary randomly as it passes through the fiber media between the optical carrier light source and the modulator.

A number of previously-disclosed transmissive-type modulators have been shown to modulate an optical carrier wave independently of its polarization. For example, U.S. application Ser. No. 15/417,569 (incorporated by reference in its entirety), discloses a polarization insensitive integrated optical modulator which may be based on a four-port modulator (FPM) such as a four-port in-phase/quadrature-phase modulator (IQM) or a four-port MZM. These FPMs are sometimes called "cross-state" modulators. Similarly, U.S. application Ser. No. 15/601,706 (incorporated by reference in its entirety) discloses a transmissive-type modulator based on a four-port micro-ring (MR) resonator which modulates an optical carrier wave independently of the incoming carrier's polarization. This type of FPM is sometimes called a "bypass-state" modulator.

Polarization-insensitive transmissive-type modulators (PITMs) can be used in conjunction with wavelength-division multiplexing (WDM). In FIG. 1, which is comparable to a portion of FIG. 7 of U.S. application Ser. No. 15/417,569, WDM modulator 110 receives a multi-wavelength continuous wave (CW) light 100 and produces a multi-wavelength modulated signal 180. Light source 102 produces multi-wavelength CW light 100 and sends it to WDM modulator 110 via fiber 104. At demultiplexor 118, multi-wavelength CW light 100 is demultiplexed into individual, single-wavelength CW lights $120_1$-$120_n$, each of which are then modulated by polarization-insensitive transmissive type $124_1$-$124_n$, which can be based on, for example, cross-state or bypass-state four port modulators. The modulated output signals $126_1$-$126_n$ are then combined into a multi-wavelength modulated signal 180 by multiplexor 130.

However, the foregoing design has proven deficient in terms of size, cost, and complexity.

SUMMARY

The embodiments of this disclosure are directed at embodiments of WDM PITMs. In a first embodiment of a WDM PITM, the WDM PITM comprises a first polarization splitter-rotator (PSR), a first demultiplexor coupled to the first PSR, a second demultiplexor coupled to the first PSR, a plurality of FPMs, wherein each FPM is coupled to the first demultiplexor and with the second demultiplexor, a first multiplexor coupled to the plurality of FPMs, a second multiplexor coupled to the plurality of FPMs, and a second PSR coupled to the first multiplexor and with the second multiplexor.

In a variation of the first embodiment, the first PSR comprises an input port, a first output port, and a second output port, and the first PSR is configured to receive, at its input port, a multi-wavelength CW light, split the multi-wavelength CW light into a first multi-wavelength CW light and a second multi-wavelength CW light, the first multi-wavelength CW light has a transverse electric (TE) polarization orientation and travels in a clockwise direction, and the second multi-wavelength CW light has a transverse magnetic (TM) polarization orientation and travels in a counter-clockwise direction; further, the first PSR is configured to rotate the second multi-wavelength CW light by 90 degrees, such that the second multi-wavelength CW light exhibits TE polarization, transmit, from its first output port, the first multi-wavelength CW light and transmit, from its second output port, the second multi-wavelength CW light.

In a variation of the first embodiment, the first demultiplexor comprises an input port and a plurality of output ports; the first demultiplexor is configured to receive, at its input port, a first multi-wavelength CW light and transmit, from its plurality of output ports, a plurality of single-wavelength CW lights, wherein one single-wavelength CW light is transmitted from each one of its output ports. Further, the second demultiplexor comprises an input port and a plurality of output ports; the second demultiplexor is configured to receive, at its input port, a second multi-wavelength CW light and transmit, from its plurality of output ports, a plurality of single-wavelength CW lights, wherein one single-wavelength CW light is transmitted from each one of its output ports.

In a variation of the first embodiment, each FPM comprises a first input port, a second input port, a first output port, and a second output port, and each FPM is configured to receive, at its first input port, a first single-wavelength CW light from the first demultiplexor, receive, at its second input port, a second single-wavelength CW light from the second demultiplexor, modulate the received first single-wavelength CW light to produce a first single-wavelength modulated signal, modulate the received second single-wavelength CW light to produce a second single-wavelength modulated signal, transmit, from its first output port, the first single-wavelength modulated signal, and transmit, from its second output port, the second single-wavelength modulated signal.

Further, in a related variation, each FPM may be a MZM, an IQM, or a MR resonator. When each FPM is an MZM, each MZM may comprise a first optical coupler coupling the first single-wavelength CW light and the second single-wavelength modulated signal, a second optical coupler coupling the second single-wavelength CW light and the first single-wavelength modulated signal, a first tap coupling out a first portion of the first single-wavelength modulated signal to send to a monitor photodetector (mPD), a second tap coupling out a second portion of the second single-wavelength modulated signal to send to the mPD, wherein the mPD is configured to generate a combined PD current, and a processor coupled to the mPD and configured to generate a bias current according to the combined PD current and apply the bias current to a phase shifter on an arm of the MZM to control the MZM. When each FPM is an IQM, each IQM may comprise a first optical coupler coupling the first single-wavelength CW light and the second single-wavelength modulated signal, a second optical coupler coupling the second single-wavelength CW light and the first single-wavelength modulated signal, a first tap coupling out a first portion of the first single-wavelength modulated signal to send to a mPD, a second tap coupling out a second portion of the second single-wavelength modulated signal to send to the mPD, wherein the mPD is configured to generate a combined PD current, and a processor coupled to the mPD and configured to generate three bias currents based on the combined PD current, and apply the three bias currents to a first phase shifter on the in-phase channel of the IQM, a second phase shifter on the quadrature-phase channel of the IQM, and a third phase shifter on the parent channel of the IQM, to control the IQM.

In a variation of the first embodiment, the first multiplexor comprises a plurality of input ports and an output port, and is configured to receive, at each its plurality of input ports, a first single-wavelength modulated signal from one of the plurality of FPMs and transmit, from its output port, a first multi-wavelength modulated signal. Further, the second multiplexor comprises a plurality of input ports and an output port, and is configured to receive, at each its plurality of input ports, a second single-wavelength modulated signal from one of the plurality of FPMs and transmit, from its output port, a second multi-wavelength modulated signal.

In a variation of the first embodiment, the second PSR comprises a first input port, a second input port, and an output port, and is configured to receive, at its first input port, a first multi-wavelength modulated signal, receive, at its second input port, a second multi-wavelength modulated signal, rotate the first or second multi-wavelength modulated signal by 90 degrees, combine the first multi-wavelength modulated signal and the second multi-wavelength modulated signal to produce a WDM PITM output signal, and transmit, from its output port, the WDM PITM output signal.

In a variation of the first embodiment, the first demultiplexor, the second demultiplexor, the first multiplexor, and the second multiplexor are arrayed waveguide gratings or micro ring resonators.

In a second embodiment, a method of modulating a multi-wavelength CW light using a WDM PITM comprises splitting, by a first PSR of the WDM PITM, a multi-wavelength CW light into a first multi-wavelength CW light and a second multi-wavelength CW light, splitting, by a first demultiplexor of the WDM PITM, the first multi-wavelength CW light into a first plurality of single-wavelength CW lights, splitting, by a second demultiplexor of the WDM PITM, the second multi-wavelength CW light into a second plurality of single-wavelength CW lights, modulating, by a plurality of FPMs of the WDM PITM, the first plurality of single-wavelength CW lights and the second plurality of single-wavelength CW lights into a first plurality of single-wavelength modulated signals and a second plurality of single-wavelength modulated signals, combining, by a first multiplexor of the WDM PITM, the first plurality of single-wavelength modulated signals into a first multi-wavelength modulated signal, combining, by a second multiplexor of the WDM PITM, the second plurality of single-wavelength modulated signals into a second multi-wavelength modulated signal, and combining, by a second PSR of the WDM PITM, the first multi-wavelength modulated signal and the second multi-wavelength modulated signal into a WDM PITM output signal.

In a variation of the second embodiment, the first multi-wavelength CW light has a transverse electric polarization orientation and travels in a clockwise direction, the second multi-wavelength polarized signal has a TM polarization orientation and travels in a counter-clockwise direction, after the first PSR splits the multi-wavelength CW light into the first multi-wavelength CW light and the second multi-wavelength CW light, and the first PSR rotates the second multi-wavelength CW light by 90 degrees.

In a variation of the second embodiment, splitting the multi-wavelength CW light comprises receiving, at an input port of the first PSR, the multi-wavelength CW light, splitting the multi-wavelength CW light into a first multi-wavelength CW light and a second multi-wavelength CW light, wherein the first multi-wavelength CW light has a transverse electric polarization orientation and travels in a clockwise direction, and wherein the second multi-wavelength CW light has a TM polarization orientation and travels in a counter-clockwise direction, rotating the second multi-wavelength CW light by 90 degrees, transmitting, from a first output port of the PSR, the first multi-wavelength CW light, and transmitting, from a second output port of the PSR, the second multi-wavelength CW light.

In a variation of the second embodiment, modulating the first plurality of single-wavelength CW lights and the second plurality of single-wavelength CW lights comprises, for each FPM, receiving, at a first input port, one single-wavelength CW light of the first plurality of single-wavelength CW lights and modulating the received single-wavelength CW light to produce a first single-wavelength modulated signal, receiving, at a second input port, one single-wavelength CW light of the second plurality of single-wavelength CW lights and modulating the received single-wavelength CW light to produce a second single-wavelength polarized signal, transmitting, from a first output port, the first single-wavelength modulated signal, and transmitting, from a second output port, the second single-wavelength polarized signal.

In a variation of the second embodiment, each FPM of the plurality of FPMs comprises a cross-state modulator, and in another variation, each FPM of the plurality of FPMs comprises a bypass-state modulator.

In a variation of the second embodiment, combining the first plurality of single-wavelength modulated signals into the first multi-wavelength modulated signal comprises receiving, at a plurality of input ports of the first multiplexor, the first plurality of single-wavelength modulated signals, combining the first plurality of single-wavelength modulated signals into the first multi-wavelength modulated signal, and transmitting, from an output port of the first multiplexor, the first multi-wavelength signal. Further, combining the second plurality of single-wavelength modulated signals into a second multi-wavelength polarized signal comprises receiving, at a plurality of input ports of the first multiplexor, the second plurality of single-wavelength modulated signals, combining the second plurality of single-wavelength modulated signals into the second multi-wavelength modulated signal, and transmitting, from an output port of the second multiplexor, the second multi-wavelength modulated signal.

In a third embodiment of an WDM PITM, the WDM PITM comprises an input port configured to receive a multi-wavelength CW light, an output port configured to transmit a multi-wavelength modulated signal, and a plurality of FPMs coupled to the input port and the output port. Further, each FPM comprises a first input port configured to receive a first single-wavelength CW light, wherein the first single-wavelength polarized CW light has been extracted from the multi-wavelength CW light, wherein the first single-wavelength CW light has a transverse electric polarization orientation, and wherein the first single-wavelength CW light travels in a clockwise direction. Further, each FPM comprises a second input port configured to receive a second single-wavelength CW light, wherein the second single-wavelength CW light has been extracted from the multi-wavelength CW light, wherein the second single-wavelength CW light has a TM polarization orientation that has been rotated 90 degrees, and wherein the second single-wavelength CW light travels in a counter-clockwise direction. Further, each FPM comprises a first output port configured to transmit a first single-wavelength modulated signal, wherein the first single-wavelength modulated signal has been created by modulating the first single-wavelength CW light. Further, each FPM comprises a second output port configured to transmit a second single-wavelength modulated signal, wherein the second single-wavelength modulated signal has been created by modulating the second single-wavelength CW light. Further, in this embodiment, the multi-wavelength modulated signal comprises the first single-wavelength modulated signal and the second single-wavelength modulated signal of each of the FPMs.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

In a typical data center configuration, there are multiple WDM modulators, and each requires its own light source. Thus a need exists for an integrated multi-channel WDM PITM that can be incorporated into a data center configuration having a multi-channel light source provided from a centralized laser bank. The following embodiments disclose illustrative implementations of integrated multi-channel WDM PITMs which are smaller in size, less expensive to manufacture, and simpler than previously-known WDM PITMs. Further, the disclosed embodiments can be used, for example, in end-of-row (EOR) switches and rack servers in data centers using a multi-wavelength light from a centralized laser bank. The disclosed embodiments may be implemented using any number of techniques, whether currently known or in existence, but are not limited to the illustrative implementations, drawings, and techniques illustrated below.

Figure 1:
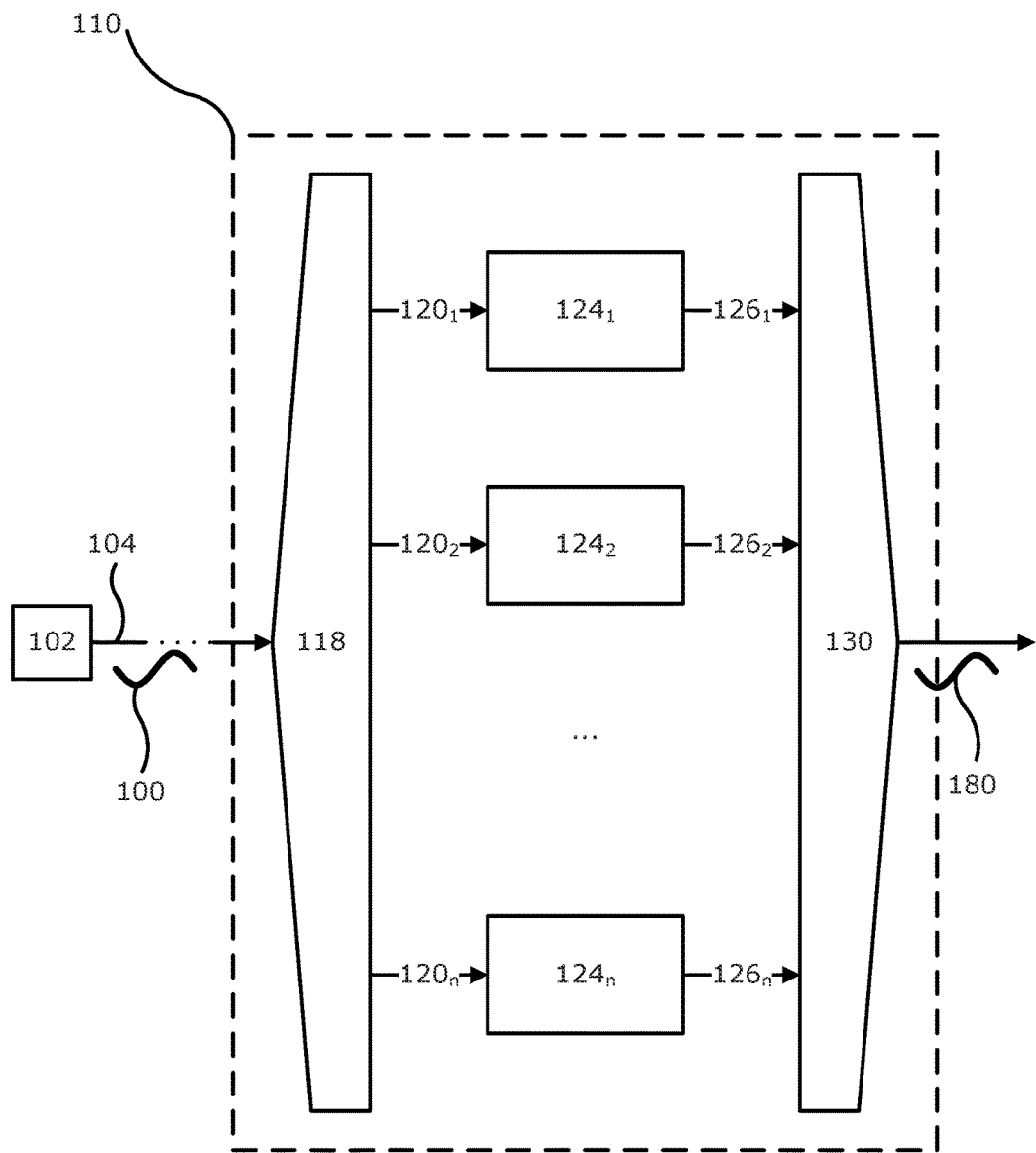
FIG. 1 shows PITMs in conjunction with WDM technology known in the art.
Figure 2:
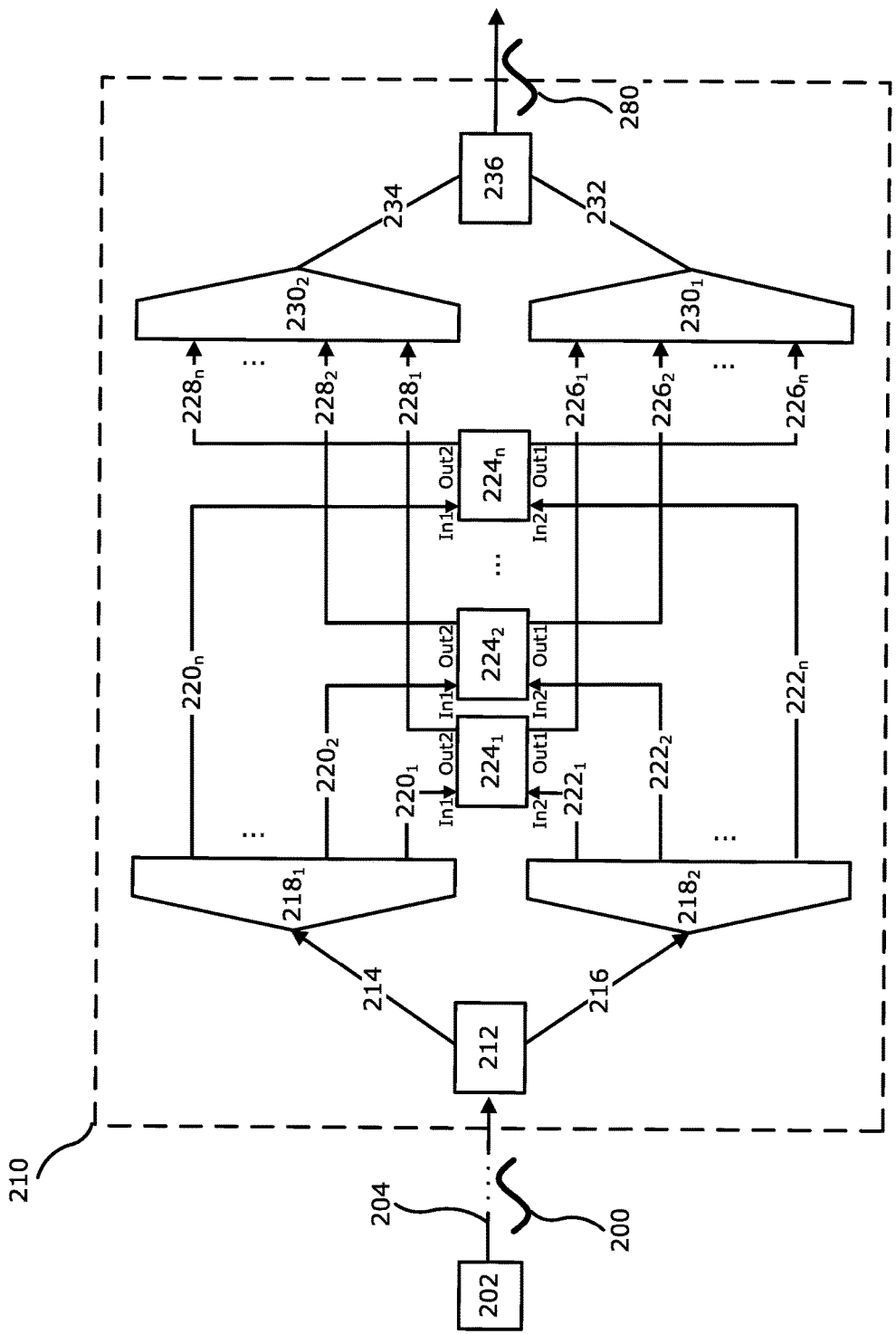
FIG. 2 shows a WDM PITM according to an embodiment of the present disclosure.

In a first embodiment of the present disclosure shown in FIG. 2, integrated WDM PITM 210 receives a multi-wavelength CW light 200 and produces a multi-wavelength modulated signal 280. Light source 202 sends multi-wavelength CW light 200 with arbitrary polarization via fiber 204 to WDM PITM 210, which includes two PSRs 212 and 236, two demultiplexors $218_1$ and $218_2$, a plurality of FPMs $224_1$-$224_n$, and two multiplexors $230_1$ and $230_2$.

Upon entering WDM PITM 210, PSR 212 splits multi-wavelength CW light 200 into a first multi-wavelength CW light 214 and a second multi-wavelength CW light 216. Multi-wavelength CW light 214 has a TE polarization and travels clockwise. Multi-wavelength CW light 216 has a TM polarization, travels counter-clockwise, and is rotated 90° by PSR 212, to also exhibit TE polarization.

Multi-wavelength CW light 214 then enters demultiplexor $218_1$ which splits multi-wavelength CW light 214 into a plurality of single-wavelength CW lights $220_1$-$220_n$. Similarly, multi-wavelength polarized signal 216 enters demultiplexor $218_2$ which splits multi-wavelength CW light 216 into a plurality of single-wavelength CW lights $222_1$-$222_n$.

Each of the single-wavelength CW lights $220_1$-$220_n$ enters input port In1 of one of the plurality of FPMs $224_1$-$224_n$ respectively, and each of the single-wavelength CW lights $222_1$-$222_n$ enters input port In2 of one of the plurality of FPMs $224_1$-$224_n$ respectively. Each of FPMs $224_1$-$224_n$ modulates its respective single-wavelength CW lights $220_1$-$220_n$ and $222_1$-$222_n$ to produce single-wavelength polarized CW lights $226_1$-$226_n$ and $228_1$-$228_n$, at output ports Out1 and Out2, respectively, with CW lights $220_1$-$220_n$ corresponding to CW lights $226_1$-$226_n$, and CW lights $222_1$-$222_n$ corresponding to CW lights $228_1$-$228_n$.

Multiplexor $230_1$ combines single-wavelength modulated signals $226_1$-$226_n$, output from FPMs $224_1$-$224_n$, into multi-wavelength modulated signal 232. Similarly, multiplexor $230_2$ combines single-wavelength modulated signals $228_1$-$228_n$ into multi-wavelength modulated signal 234. PSR 236 then combines multi-wavelength modulated signals 232 and 234 by rotating one of them by 90 degrees to produce WDM PITM output signal 280.

Figure 3:
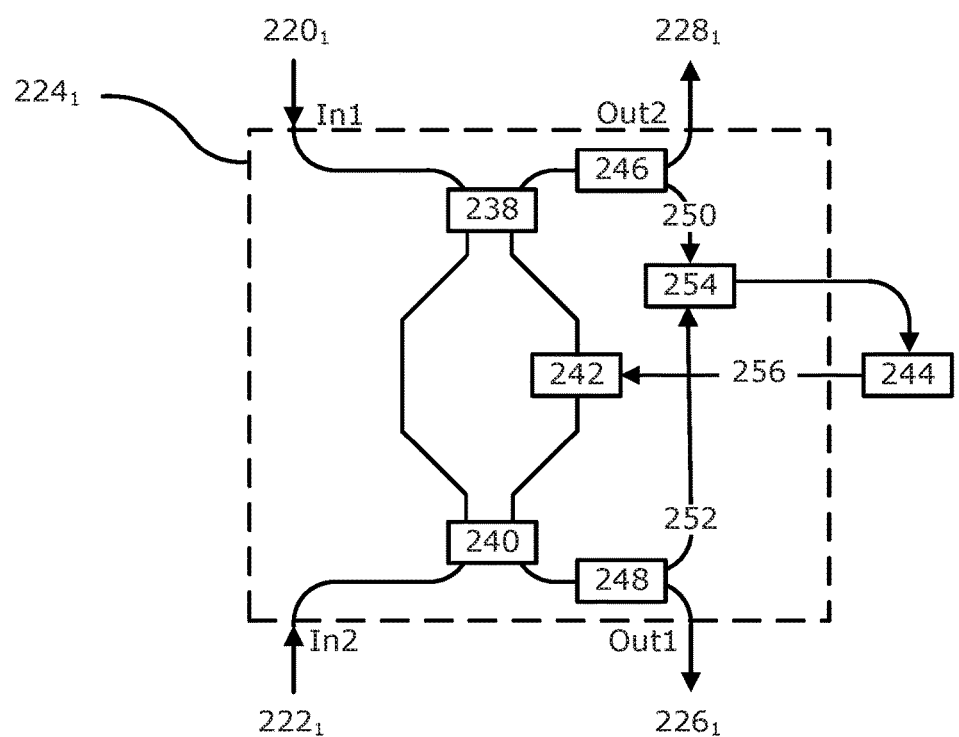
FIG. 3 shows a detailed view of a four-port MZM that is suitable for use with the embodiment of FIG. 2.

As suggested by the relative placement of input ports In1 and In2 and output ports Out1 and Out2 of FPMs $224_1$-$224_n$, FPMs $224_1$-$224_n$ are cross-state FPMs; that is, input port In1 and output port Out1 are crisscross from one another, as are input port In2 and output port Out2. FIG. 3 is a more-detailed depiction of an embodiment of an FPM $224_1$ which uses a four-port MZM. Input signal $220_1$ enters input port In1 of FPM $224_1$ and input signal $222_1$ enters input port In2 of FPM $224_1$. Input signals $220_1$ and $222_1$ are launched into the four-port MZM via 50/50 optical couplers 238 and 240 and are modulated by electrical data and are bias controlled by signal 256. Taps 246 and 248 extract optical signals 250 and 252 from the modulated signals, are converted to electrical signals by mPD 254 and forwarded to control circuit 244 to produce bias control signal 256 which is provided to phase shifter 242. Modulated signal $228_1$ exits FPM $224_1$ at output port Out2 and modulated signal $226_1$ exits FPM $224_1$ at output port Out1. Operation of FPM $224_1$ is disclosed in greater detail in U.S. application Ser. No. 15/417,569. One of ordinary skill will recognize that an IQM would be configured similarly to the MZM of FIG. 3, except that there would be a phase shifter on the I-channel MZM, the Q-channel MZM, and the parent MZM.

In a variation on this embodiment, the components of FIG. 2 can be rearranged so that the WDM PITM uses MR resonators for the FPMs. Thus, in a second embodiment of the present disclosure shown in FIG. 4, integrated WDM PITM 410 receives a multi-wavelength CW light 400 and produces a multi-wavelength modulated signal 480. Light source 402 sends multi-wavelength CW light 400 via fiber 404 to WDM PITM 410, which includes two PSRs 412 and 436, two demultiplexors $418_1$ and $418_2$, a plurality of FPMs $424_1$-$424_n$, and two multiplexors $430_1$ and $430_2$.

Upon entering WDM PITM 410, PSR 412 splits multi-wavelength CW light 400 into a first multi-wavelength CW light 414 and a second multi-wavelength CW light 416. Multi-wavelength CW light 414 has a TE polarization and travels clockwise. Multi-wavelength CW light 416 has a TM polarization, travels counter-clockwise, and is rotated 90° by PSR 412.

Multi-wavelength CW light 414 then enters demultiplexor $418_1$ which splits multi-wavelength CW light 414 into a plurality of single-wavelength CW lights $420_1$-$420_n$. Similarly, multi-wavelength CW light 416 enters demultiplexor $418_2$ which splits multi-wavelength CW light 416 into a plurality of single-wavelength CW lights $422_1$-$422_n$.

Each of the single-wavelength CW lights $420_n$ enters input port In1 of one of the plurality of FPMs $424_1$-$424_n$ respectively, and each of the single-wavelength CW lights $422_n$ enters input port In2 of one of the plurality of FPMs $424_1$-$424_n$ respectively. Each of the FPMs $424_1$-$424_n$ modulates its respective single-wavelength CW lights $420_1$-$420_n$ and $422_1$-$422_n$ to produce single-wavelength modulated CW lights $426_1$-$426_n$ and $428_1$-$428_n$, at output ports Out1 and Out2, respectively, with CW lights $420_1$-$420_n$ corresponding to CW lights $426_1$-$426_n$ and CW lights $422_1$-$422_n$ corresponding to CW lights $428_1$-$428_n$.

Multiplexor $430_1$ combines each single-wavelength modulated signals $426_1$-$426_n$, output by FPMs $424_1$-$424_n$, into multi-wavelength modulated signal 432. Similarly, multiplexor $430_2$ combines single-wavelength modulated signals $428_1$-$428_n$ into multi-wavelength polarized signal 434. However, note that unlike FIG. 2, because WDM PITM 410 utilizes bypass-state FPMs $424_1$-$424_n$, the positions of multiplexors $430_1$ and $430_2$ have been swapped with respect to multiplexors $230_1$ and $230_2$ of FIG. 2. Finally, PSR 436 combines multi-wavelength polarized modulated signals 432 and 434 by rotating one of them by 90 degrees to produce modulated WDM PITM output signal 480.

Figure 5:
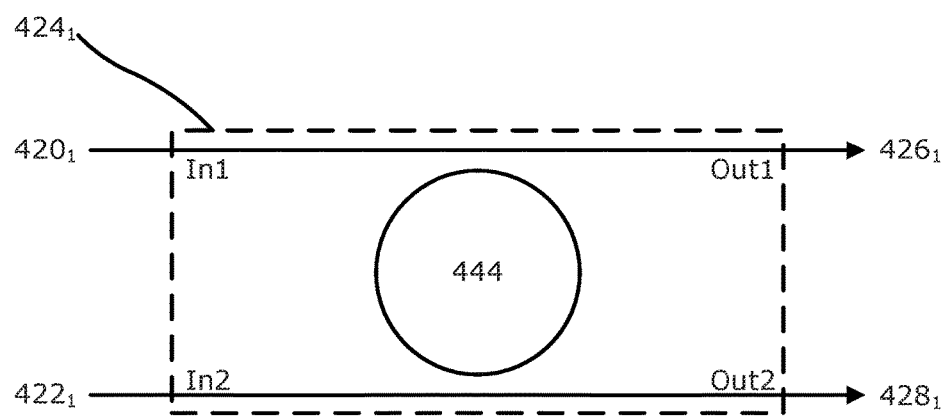
FIG. 5 shows a detailed view of a four-port MR resonator that is suitable for use with the embodiment of FIG. 4.

As suggested by the relative placement of input ports In1 and In2 and output ports Out1 and Out2 of FPMs $424_1$-$424_n$, FPMs $424_1$-$424_n$ are bypass-state FPMs, for example, MR resonators. FIG. 5 is a more-detailed depiction of an embodiment of an FPM, such as FPM $424_1$, which uses an MR resonator. Input signal $420_1$ enters input port In1 of FPM $424_1$ and input signal $422_1$ enters input port In2 of FPM $424_1$. Input signals $420_1$ and $422_1$ are modulated by electrical data via MR heater 444 to produce modulated signals $426_1$ and $428_1$ respectively. Modulated signal $426_1$ exits FPM $424_1$ at output port Out1 and modulated signal $428_1$ exits FPM $424_1$ at output port Out2. Operation of FPM $424_1$ is disclosed in greater detail in U.S. application Ser. No. 15/601,706.

Figure 6:
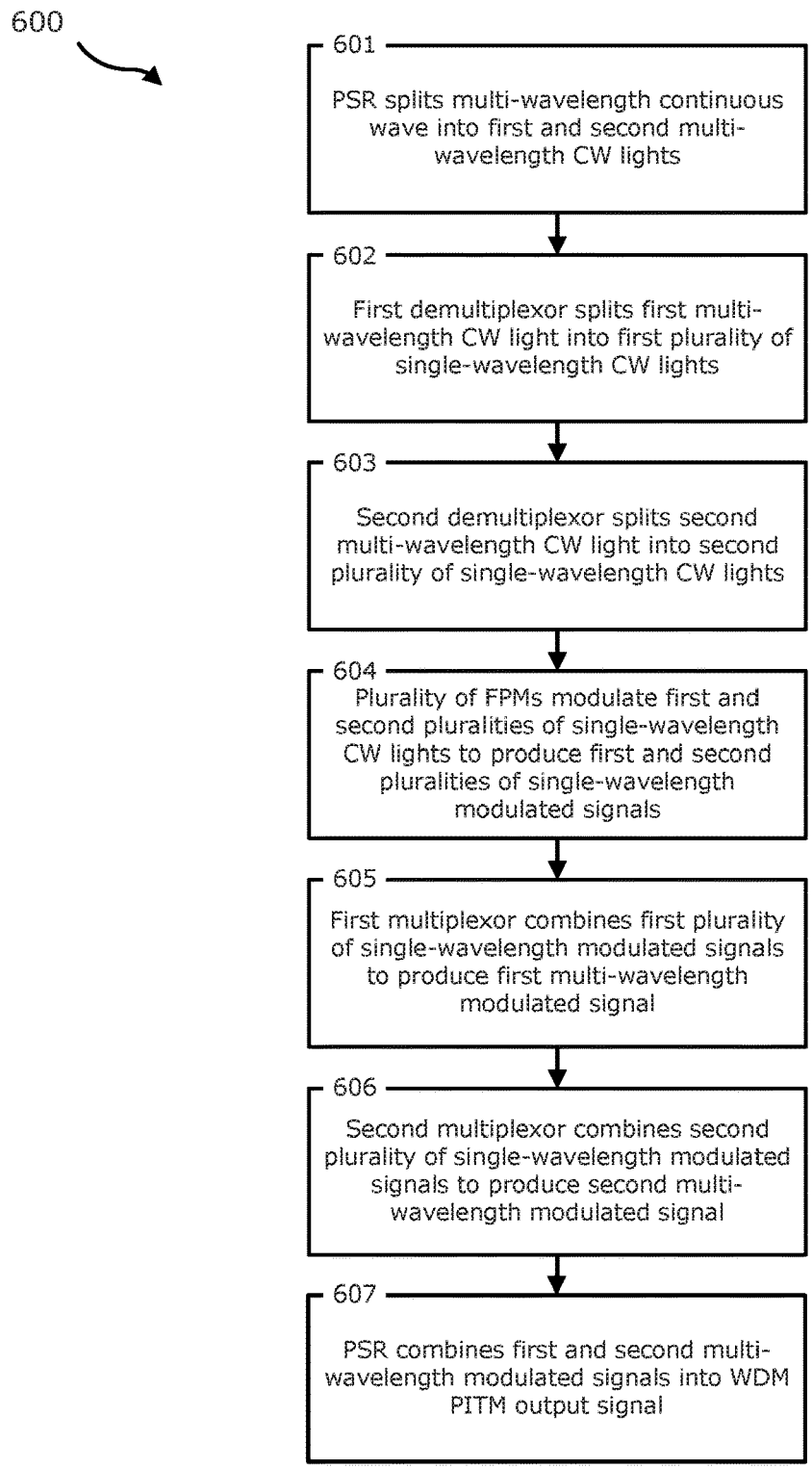
FIG. 6 shows a flowchart of the operation of a WDM PITM according to an embodiment of the present disclosure.

One of ordinary skill will recognize that while the physical layout of WDM PITM 210 in FIG. 2 is different from the physical layout of WDM PITM 410 in FIG. 400, both operate similarly, as shown by flowchart 600 of FIG. 6. In operation 601, PSRs 212/412 splits multi-wavelength CWs 200/400 to produce two multi-wavelength signals 214/414 and 216/416, with TE polarization. In some embodiments, PSRs 212/412 may use conventional polarization beam splitting and TM polarization rotation; in some embodiments, PSRs 212/412 may be replaced by a generic polarization beam splitter followed by a polarization rotator, such as a Faraday rotator, or they may use other technologies which split and rotate one of the polarized optical signals.

In operation 602, demultiplexors $218_1$/$418_1$ split multi-wavelength CW light 214/414 into a plurality of single-wavelength CW lights $220_1$-$220_n$/$420_1$-$420_n$. Similarly, in operation 603, demultiplexors $218_2$/$418_2$ split multi-wavelength CW light 216/416 into a plurality of single-wavelength CW lights $222_1$-$222_n$/$422_1$-$422_n$. In some embodiments, demultiplexors $218_1$/$418_1$ and $218_2$/$418_2$ may use arrayed waveguide grating or other technologies, like micro ring resonators, which demultiplex optical signals.

Figure 4:
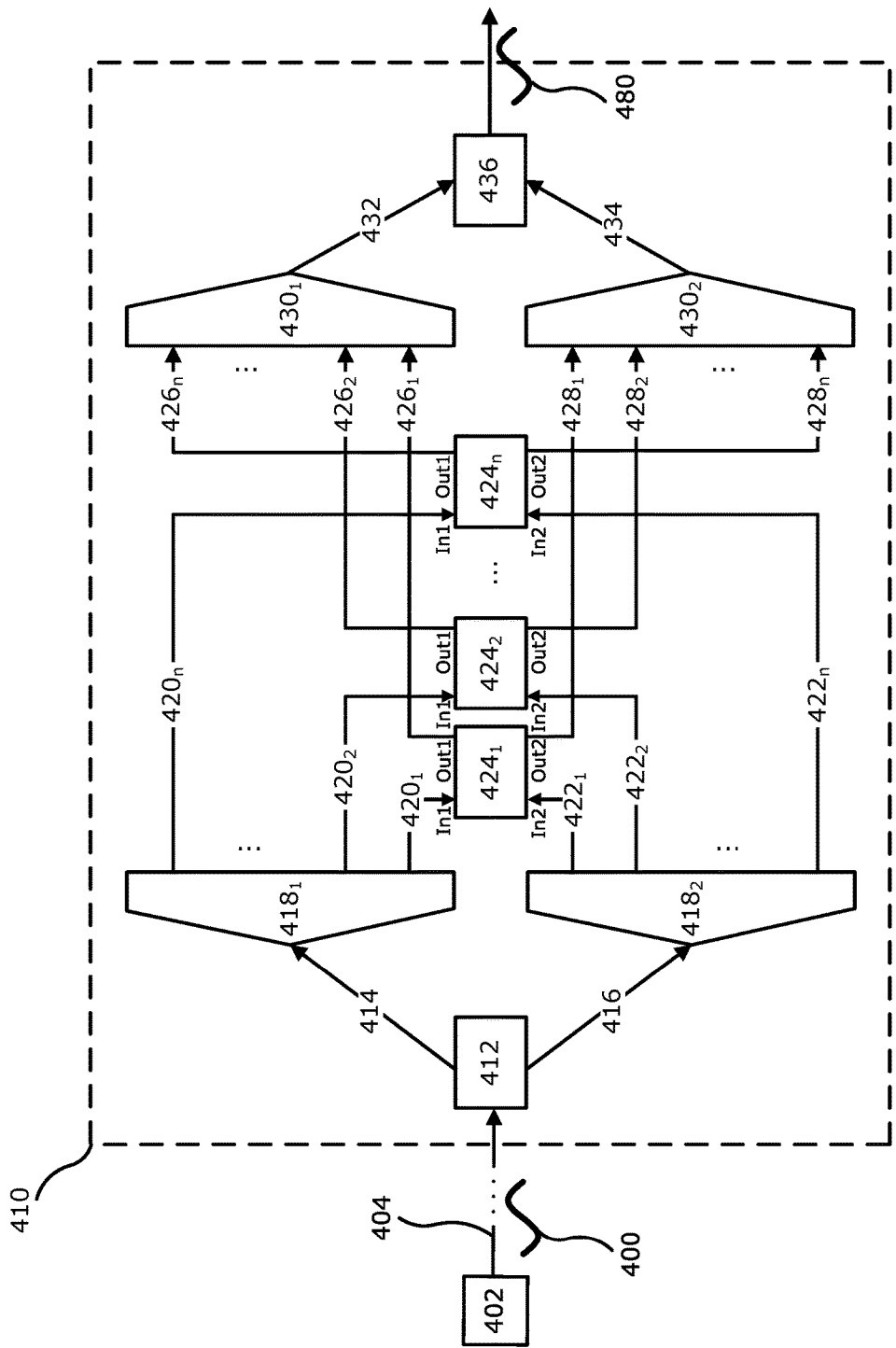
FIG. 4 shows a WDM PITM according to an embodiment of the present disclosure.

In operation 604, FPMs modulate single-wavelength CW lights to produce single-wavelength modulated signals. When the FPMs are cross-state FPMs (as shown in the embodiment of FIGS. 2 and 3), single-wavelength CW lights $220_1$-$220_n$ may enter port 2 of each of FPMs $224_1$-$224_n$ with the corresponding single-wavelength modulated signals $226_1$-$226_n$ exiting port 3; similarly, single-wavelength CW lights $222_1$-$222_n$ may enter port 1 of each of FPMs $224_1$-$224_n$ with the corresponding single-wavelength modulated signals $228_1$-$228_n$ exiting port 4. FPMs $224_1$-$224_n$ may be MZMs, IQMs, or any other type of cross-state FPM. When the FPMs are bypass-state FPMs (as shown in the embodiment of FIGS. 4 and 5), single-wavelength CW lights $420_1$-$420_n$ may enter port 1 of each of FPMs $424_1$-$424_n$ with the corresponding single-wavelength modulated signals $426_1$-$426_n$ exiting port 3; similarly, single-wavelength CW lights $422_1$-$422_n$ may enter port 2 of each of FPMs $424_1$-$424_n$ with the corresponding single-wavelength modulated signals $428_1$-$428_n$ exiting port 4. FPMs $424_1$-$424_n$ may be MR resonators or any other type of bypass-state FPM.

In operation 605, multiplexors $230_1$/$430_1$ combine single-wavelength modulated signals $226_1$-$226_n$/$426_1$-$426_n$ to produce multi-wavelength modulated signals 232/432. Similarly, in operation 606, multiplexors $230_2$/$430_2$ combine single-wavelength modulated signals $228_1$-$228_n$/$428_1$-$428_n$ to produce multi-wavelength modulated signals 234/434. In some embodiments, multiplexors $230_1$/$430_1$ and $230_2$/$430_2$ may use arrayed waveguide grating or other technologies, like micro ring resonators, which multiplex optical signals.

In operation 607, PSRs 236/436 combine multi-wavelength modulated signals 232/432 and 234/434 to produce modulated WDM PITM output signal 280/480. In some embodiments, PSRs 236/436 may use conventional polarization beam splitting and TM polarization rotation; in some embodiments, PSRs 236/436 may be replaced by a generic polarization beam splitter followed by a polarization rotator, such as a Faraday rotator, or they may use other technologies which rotate and rejoin polarized optical signals.

Figure 7:
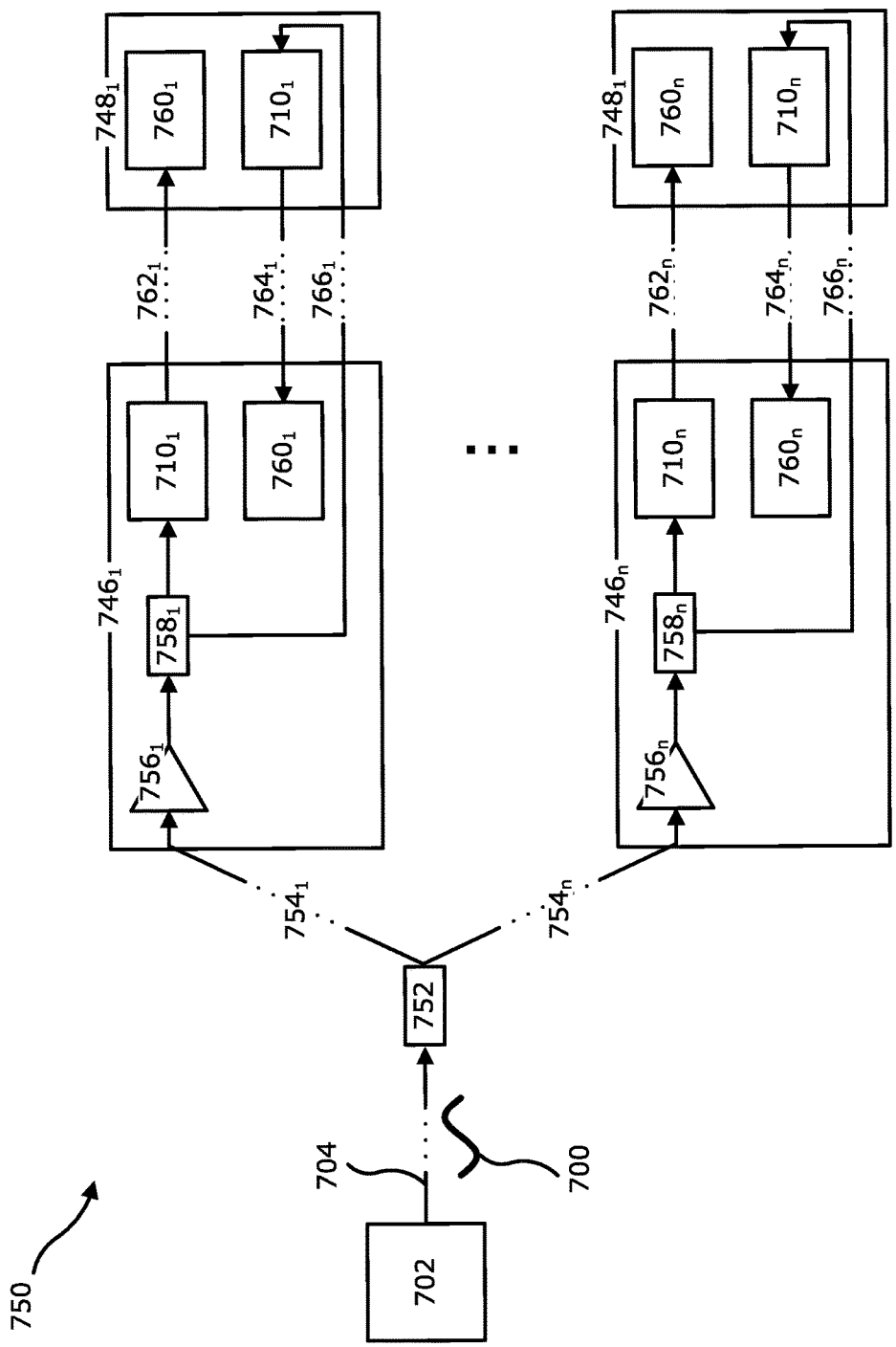
FIG. 7 shows example of a data center that incorporates WDM PITMs according to embodiments of the present disclosure.

The integrated WDM PITMs of the present disclosure may be incorporated into the EOR switches and rack servers of data center 750 as shown in FIG. 7. Data center optical network 750 includes centralized light source 702 which produces multi-wavelength CW light 700, EOR switches $746_1$-$746_n$, and rack servers $748_1$-$748_n$. Multi-wavelength CW light 700 passes over fiber 704 to splitter 752 which splits CW 700 into multiple copies passing over fiber $754_1$-$754_n$ to each of EOR switches $746_1$-$746_n$. Each of EOR switches $746_1$-$746_n$ includes an erbium-doped fiber amplifier (EDFA) 756, if necessary, a splitter 758, a WDM PITM 710 according to the present disclosure, and a WDM receiver 760 as would be known to one of ordinary skill.

Fibers 762, 764, and 766 connect each of EOR switches 746$_1$-746$_n$ to each of rack servers 748$_1$-748$_n$. In operation, multi-wavelength CW light 700 is amplified by an EDFA 756, the amplified signal is split by splitter 758, with part of the signal sent to a WDM PITM 710 in an EOR switch 746 and part of the signal sent to a WDM PITM 710 in a rack server 748 via fiber 766. A WDM PITM 710 in an EOR switch 746 modulates multi-wavelength CW light 700 and sends the modulated signal to a WDM receiver 760 in a rack server 748, and similarly, a WDM PITM 710 in a rack server 748 modulates multi-wavelength CW light 700 and sends the modulated signal to a WDM receiver 760 in an EOR switch 746.

One of ordinary skill will recognize that the foregoing embodiments are meant as examples and not limitations of the embodiments of the present disclosure. Thus by way of example and not limitation, in some embodiments, the WDM PITMs may be fabricated using known silicon-on-insulator techniques or other fabrication methods which produce comparable integrated devices. In some embodiments the functionality of individual components within the integrated WDM PITMs may overlap or be combined. In some embodiments, the functions of the PSRs, demultiplexor, and/or multiplexors may be performed by multi-function components. Further, the foregoing embodiments may include other components not otherwise described but which may be useful in implementing WDM PITMs, thus in some embodiments, the integrated WDM PITMs may also include waveguides, photodiodes, high-speed drivers, electrical connections, control circuits, programmable logic, heaters, and/or other components known to be useful and/or necessary in building optical modulation and transmission components.

One of ordinary skill will recognize a number of benefits of the WDM PITMs of the present disclosure. By way of example and not limitation, integrating the various components of the WDM PITMs of the present disclosure into a single integrated device reduces the cost of manufacturing and the amount of space required for the equipment required for modulating a WDM signal. Further, by placement of the multiplexors and FPMs in close proximity, the connector return loss between the FPMs and the multiplexors can be eliminated. Further, because the input to the integrated WDM PITMs is a multi-wavelength CW light, a single, centralized light source may be used as the input signal for multiple WDM PITMs.

Thus, embodiments of a WDM PITM according to the present disclosure may comprises a means for splitting and rotating a multiplexed input signal, a means for demultiplexing the input signal, a means for modulating the demultiplexed input signals, a means for multiplexing each of the modulated signals, and a means for combining the modulated signals. Further, embodiments of a WDM PITM according to the present disclosure may comprise a means for splitting a multi-wavelength CW light into a first multi-wavelength CW light and a second multi-wavelength CW light, a means for splitting the first multi-wavelength CW light into a first plurality of single-wavelength CW lights, a means for splitting the second multi-wavelength CW light into a second plurality of single-wavelength CW lights, a means for modulating the first plurality of single-wavelength CW lights and the second plurality of single-wavelength CW lights into a first plurality of single-wavelength modulated signals and a second plurality of single-wavelength modulated signals, a means for combining the first plurality of single-wavelength modulated signals into a first multi-wavelength modulated signal, a means for combining the second plurality of single-wavelength modulated signals into a second multi-wavelength modulated signal, and a means for combining the first multi-wavelength modulated signal and the second multi-wavelength modulated signal into a WDM PITM output signal. Further embodiments of a WDM PITM according to the present disclosure may comprise a means for receiving a multi-wavelength CW light, an means for transmitting a multi-wavelength modulated signal, and a means for receiving, modulating, and transmitting a plurality of single-wavelength polarized CW signal has been extracted from the multi-wavelength CW signal.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one of ordinary skill and may be made without departing from the spirit and scope disclosed herein.

What is claimed is:

1. A wavelength-division multiplexed (WDM) polarization insensitive transmissive-type modulator (PITM) comprising:
    a first polarization splitter-rotator (PSR);
    a first demultiplexor coupled to the first PSR;
    a second demultiplexor coupled to the first PSR;
    a plurality of multi-port modulators, each multi-port modulator being coupled to the first demultiplexor and the second demultiplexor and comprising a first output port configured to transmit a first single-wavelength modulated signal, the first single-wavelength modulated signal comprising a modulated first single-wavelength continuous wavelength (CW) light beam, and a second output port configured to transmit a second single-wavelength modulated signal, the second single-wavelength modulated signal comprising a modulated second single-wavelength CW light beam;
    a first multiplexor coupled to the plurality of multi-port modulators;
    a second multiplexor coupled to the plurality of multi-port modulators; and
    a second PSR coupled to the first multiplexor and with the second multiplexor, the second PSR configured to output a multi-wavelength modulated signal that includes the first single-wavelength modulated signal and the second single-wavelength modulated signal of each of the multi-port modulators.

2. The WDM PITM of claim 1:
    wherein the first PSR is configured to:
        receive, at a first PSR input port, a multi-wavelength CW light beam;

split the multi-wavelength CW light beam into a first multi-wavelength CW light beam and a second multi-wavelength CW light beam, wherein the first multi-wavelength CW light beam has a transverse electric (TE) polarization orientation and travels in a clockwise direction, and wherein the second multi-wavelength CW light beam has a transverse magnetic (TM) polarization orientation and travels in a counter-clockwise direction;
rotate the second multi-wavelength CW light beam by 90 degrees, such that the second multi-wavelength CW light beam exhibits TE polarization;
transmit, from a first PSR output port, the first multi-wavelength CW light beam; and
transmit, from a second PSR output port, the second multi-wavelength CW light beam.

3. The WDM PITM of claim 1:
wherein the first demultiplexor comprises:
a first demultiplexor input port; and
a plurality of first demultiplexor output ports,
wherein the first demultiplexor is configured to:
receive, at the first demultiplexor input port, a first multi-wavelength CW light beam; and
transmit, from the plurality of first demultiplexor output ports, a plurality of single-wavelength CW light beams, wherein one single-wavelength CW light beam is transmitted from each one of the plurality of first demultiplexor output ports,
wherein the second demultiplexor comprises:
a second demultiplexor input port; and
a plurality of second demultiplexor output ports, and
wherein the second demultiplexor is configured to:
receive, at the second demultiplexor input port, a second multi-wavelength CW light beam; and
transmit, from the plurality of second demultiplexor output ports, a plurality of single-wavelength CW light beams, wherein one single-wavelength CW light beam is transmitted from each one of the plurality of second demultiplexor output ports.

4. The WDM PITM of claim 1:
wherein each multi-port modulator is configured to:
receive, at a first multi-port modulator input port, a first single-wavelength CW light beam from the first demultiplexor;
receive, at a second multi-port modulator input port, a second single-wavelength CW light beam from the second demultiplexor;
modulate the received first single-wavelength CW light beam to produce the first single-wavelength modulated signal;
modulate the received second single-wavelength CW light beam to produce the second single-wavelength modulated signal;
transmit, from the first output port, the first single-wavelength modulated signal; and
transmit, from the second output port, the second single-wavelength modulated signal.

5. The WDM PITM of claim 4, wherein each multi-port modulator comprises a Mach-Zehnder modulator (MZM).

6. The WDM PITM of claim 5 wherein each MZM further comprises:
a first optical coupler coupling the first single-wavelength CW light beam and the second single-wavelength modulated signal;
a second optical coupler coupling the second single-wavelength CW light beam and the first single-wavelength modulated signal;
a first tap coupling out a first portion of the first single-wavelength modulated signal to send to a monitor photodetector (mPD);
a second tap coupling out a second portion of the second single-wavelength modulated signal to send to the mPD, wherein the mPD is configured to generate a combined photodetector (PD) current; and
a processor coupled to the mPD and configured to:
generate a bias current according to the combined PD current; and
apply the bias current to a phase shifter on an arm of the MZM to control the MZM.

7. The WDM PITM of claim 4, wherein each multi-port modulator comprises an in-phase/quadrature phase modulator (IQM).

8. The WDM PITM of claim 7 wherein each IQM further comprises:
a first optical coupler coupling the first single-wavelength CW light beam and the second single-wavelength modulated signal;
a second optical coupler coupling the second single-wavelength CW light beam and the first single-wavelength modulated signal;
a first tap coupling out a first portion of the first single-wavelength modulated signal to send to a monitor photodetector (mPD);
a second tap coupling out a second portion of the second single-wavelength modulated signal to send to the mPD, wherein the mPD is configured to generate a combined photodetector (PD) current; and
a processor coupled to the mPD and configured to:
generate three bias currents based on the combined PD current; and
apply the three bias currents to a first phase shifter on an in-phase channel of the IQM, a second phase shifter on a quadrature-phase channel of the IQM, and a third phase shifter on a parent channel of the IQM, to control the IQM.

9. The WDM PITM of claim 4, wherein each multi-port modulator comprises a micro-ring (MR) resonator.

10. The WDM PITM of claim 1:
wherein the first multiplexor is configured to:
receive, at each of a plurality of first multiplexor input ports, a first single-wavelength modulated signal from one of the plurality of multi-port modulators; and
transmit, from a first multiplexor output port, a first multi-wavelength modulated signal;
wherein the second multiplexor is configured to:
receive, at each of a plurality of second multiplexor input ports, a second single-wavelength modulated signal from one of the plurality of multi-port modulators; and
transmit, from a second multiplexor output port, a second multi-wavelength modulated signal.

11. The WDM PITM of claim 1:
wherein the second PSR is configured to:
receive, at a second PSR input port, a first multi-wavelength modulated signal;
receive, at a first PSR input port, a second multi-wavelength modulated signal;
rotate the first or second multi-wavelength modulated signal by 90 degrees;
combine the first multi-wavelength modulated signal and the second multi-wavelength modulated signal to produce the multi-wavelength modulated signal; and transmit, from a PSR output port, the multi-wavelength modulated signal.

12. The WDM PITM of claim 1 wherein the first demultiplexor, the second demultiplexor, the first multiplexor, and the second multiplexor are arrayed waveguide gratings or micro ring resonators.

13. A method of modulating a multi-wavelength continuous wave (CW) light beam using a wavelength-division multiplexed (WDM) polarization insensitive transmissive-type modulator (PITM), the method comprising:
   splitting, by a first polarization splitter-rotator (PSR) of the WDM PITM, a multi-wavelength CW light beam into a first multi-wavelength CW light beam and a second multi-wavelength CW light beam;
   splitting, by a first demultiplexor of the WDM PITM, the first multi-wavelength CW light beam into a first plurality of single-wavelength CW light beams;
   splitting, by a second demultiplexor of the WDM PITM, the second multi-wavelength CW light beam into a second plurality of single-wavelength CW light beams;
   modulating, by a plurality of multi-port modulators of the WDM PITM, the first plurality of single-wavelength CW light beams and the second plurality of single-wavelength CW light beams into a first plurality of single-wavelength modulated signals and a second plurality of single-wavelength modulated signals;
   combining, by a first multiplexor of the WDM PITM, the first plurality of single-wavelength modulated signals into a first multi-wavelength modulated signal;
   combining, by a second multiplexor of the WDM PITM, the second plurality of single-wavelength modulated signals into a second multi-wavelength modulated signal;
   combining, by a second PSR of the WDM PITM, the first multi-wavelength modulated signal and the second multi-wavelength modulated signal into a multi-wavelength modulated signal; and
   outputting, from the second PSR of the WDM PITM, the multi-wavelength modulated signal including the first plurality of single-wavelength modulated signals and the second plurality of single-wavelength modulated signals.

14. The method of claim 13, wherein the first multi-wavelength CW light beam has a transverse electric polarization orientation and travels in a clockwise direction, wherein the second multi-wavelength CW light beam has a transverse magnetic polarization orientation and travels in a counter-clockwise direction, wherein after the first PSR splits the multi-wavelength CW light beam into the first multi-wavelength CW light beam and the second multi-wavelength CW light beam, the first PSR rotates the second multi-wavelength CW light beam by 90 degrees.

15. The method of claim 13, wherein splitting the multi-wavelength CW light beam comprises:
   receiving, at an input port of the first PSR, the multi-wavelength CW light beam;
   splitting the multi-wavelength CW light beam into a first multi-wavelength CW light beam and a second multi-wavelength CW light beam, wherein the first multi-wavelength CW light beam has a transverse electric polarization orientation and travels in a clockwise direction, and wherein the second multi-wavelength CW light beam has a transverse magnetic polarization orientation and travels in a counter-clockwise direction;
   rotating the second multi-wavelength CW light beam by 90 degrees;
   transmitting, from a first output port of the first PSR, the first multi-wavelength CW light beam; and
   transmitting, from a second output port of the first PSR, the second multi-wavelength CW light beam.

16. The method of claim 13, wherein modulating the first plurality of single-wavelength CW light beams and the second plurality of single-wavelength CW light beams comprises, for each multi-port modulator:
   receiving, at a first input port, one single-wavelength CW light beam of the first plurality of single-wavelength CW light beams and modulating the received single-wavelength CW light beam to produce a first single-wavelength modulated signal;
   receiving, at a second input port, one single-wavelength CW light beam of the second plurality of single-wavelength CW light beams and modulating the received single-wavelength CW light beam to produce a second single-wavelength polarized signal;
   transmitting, from a first output port, the first single-wavelength modulated signal; and
   transmitting, from a second output port, the second single-wavelength polarized signal.

17. The method of claim 13, wherein each multi-port modulator FPM of the plurality of multi-port modulators comprises a cross-state modulator.

18. The method of claim 13, wherein each multi-port modulator FPM of the plurality of multi-port modulators comprises a bypass-state modulator.

19. The method of claim 13,
   wherein combining the first plurality of single-wavelength modulated signals into the first multi-wavelength modulated signal comprises:
      receiving, at a plurality of input ports of the first multiplexor, the first plurality of single-wavelength modulated signals;
      combining the first plurality of single-wavelength modulated signals into the first multi-wavelength modulated signal; and
      transmitting, from an output port of the first multiplexor, the first multi-wavelength modulated signal, and
   wherein combining the second plurality of single-wavelength modulated signals into a second multi-wavelength polarized signal comprises:
      receiving, at a plurality of input ports of the first multiplexor, the second plurality of single-wavelength modulated signals;
      combining the second plurality of single-wavelength modulated signals into the second multi-wavelength modulated signal; and
      transmitting, from an output port of the second multiplexor, the second multi-wavelength modulated signal.

20. An wavelength-division multiplexed (WDM) polarization insensitive transmissive-type modulator (PITM) comprising:
   an input port configured to receive a multi-wavelength continuous wave (CW) light beam;
   an output port configured to transmit a multi-wavelength modulated signal; and
   a plurality of multi-port modulators coupled to the input port and the output port, wherein each multi-port modulator comprises:
      a first input port configured to receive a first single-wavelength CW light beam, wherein the first single-wavelength CW light beam has been extracted from the multi-wavelength CW light beam, wherein the first single-wavelength CW light beam has a transverse electric polarization orientation, and wherein the first single-wavelength CW light beam travels in a clockwise direction;

a second input port configured to receive a second single-wavelength CW light beam, wherein the second single-wavelength CW light beam has been extracted from the multi-wavelength CW light beam, wherein the second single-wavelength CW light beam has a transverse magnetic polarization orientation that has been rotated 90 degrees, and wherein the second single-wavelength CW light beam travels in a counter-clockwise direction;

a first output port configured to transmit a first single-wavelength modulated signal, wherein the first single-wavelength modulated signal comprising the first single-wavelength CW light beam; and a second output port configured to transmit a second single-wavelength modulated signal, wherein the second single-wavelength modulated signal comprising the second single-wavelength CW light beam, wherein the multi-wavelength modulated signal comprises the first single-wavelength modulated signal and the second single-wavelength modulated signal of each of the multi-port modulators.

21. The WDM PITM of claim 1, wherein the multi-port modulator comprises a four-port modulator (FPM).

22. The method of claim 13, wherein the multi-port modulator comprises a four-port modulator (FPM).

23. The WDM PITM of claim 20, wherein the multi-port modulator comprises a four-port modulator (FPM).

* * * * *

UNITED STATES PATENT AND TRADEMARK OFFICE
CERTIFICATE OF CORRECTION

PATENT NO. : 10,243,684 B2
APPLICATION NO. : 15/602909
DATED : March 26, 2019
INVENTOR(S) : Yangjing Wen et al.

It is certified that error appears in the above-identified patent and that said Letters Patent is hereby corrected as shown below:

On the Title Page

Column 2, (57) Abstract should read:
A wavelength-division multiplexed (WDM) polarization-independent transmissive modulator (PITM) that receives a multi-wavelength continuous wave (CW) light of indeterminate polarization, splits the multi-wavelength CW light into two transverse electric (TE) polarized components, demultiplexes the polarized components into single-wavelength CW lights, modulates the single-wavelength CW lights using four-port cross-state or bypass-state modulators, multiplexes the modulated output of the four-port modulators (FPM) into two polarized modulated components, and combines the two polarized modulated components into a multi-wavelength modulated output signal.

In the Claims

Column 14, Lines 23-28, Claims 17 and 18, should read:
17. The method of claim 13, wherein each multi-port modulator of the plurality of multi-port modulators comprises a cross-state modulator.
18. The method of claim 13, wherein each multi-port modulator of the plurality of multi-port modulators comprises a bypass-state modulator.

Signed and Sealed this
Seventh Day of May, 2019

Andrei Iancu
*Director of the United States Patent and Trademark Office*